April 14, 1959 P. F. DANEL ET AL Re. 24,632

ARTIFICIAL BLOCKS FOR STRUCTURES EXPOSED TO THE ACTION OF MOVING WATER

Original Filed March 6, 1951

3 Sheets-Sheet 1

Pierre F. Danel
Paul Angles D'Auriac
INVENTORS

BY George H. Lowy
ATTORNEY

Pierre F. Danel
Paul Angles D'Auriac
INVENTORS

BY George Hoorey
ATTORNEY

INVENTORS
Pierre F. Danel
BY Paul Angles D'Auriac
George H. Lowry
ATTORNEY

United States Patent Office

Re. 24,632
Reissued Apr. 14, 1959

24,632

ARTIFICIAL BLOCKS FOR STRUCTURES EXPOSED TO THE ACTION OF MOVING WATER

Pierre Francois Danel, La Tronche, and Paul Angles D'Auriac, Grenoble, France, assignors to Etablissements Neyrpic, Grenoble, France, a corporation of France Original No. 2,766,592, dated October 16, 1956, Serial No. 214,097, March 6, 1951. Application for reissue October 13, 1958, Serial No. 767,074

Claims priority, application France March 10, 1950

16 Claims. (Cl. 61—4)

Matter enclosed in heavy brackets [ ] appears in the original patent but forms no part of this reissue specification; matter printed in italics indicates the additions made by reissue.

This invention relates to the formation of artificial blocks for structures exposed to the action of moving water.

Frequently structures such as jetties or breakwaters present a sloping surface exposed directly to the action of the water, which may be due to waves, currents or to slow variations in level, etc. Such structures are used in the sea and also in rivers and lakes.

Wherever the action of the water is violent, it is necessary that the outer layer of material forming the sloping surface be constructed of blocks or stones of large size. Frequently, it is necessary to fabricate these elements artificially, because it is not always possible to find blocks or stones of convenient size near the place of construction or in conveniently located quarries.

Such sloping concrete structures have been constructed, for example, with blocks of concrete, which are usually given the form of a parallelepiped, because that form is very simple. However, that form presents several difficulties.

In the first place, if the structure of such artificial blocks is assembled in a regular manner, so that the blocks form a sort of pavement, it presents a very smooth surface, which has the difficulty that it permits rapid movement of the water. In the case of sea swells, for example, the rapid movement of the water allows the passage of waves over the structure. In the case of river embankments, it causes erosion at the foot of the structure. Furthermore, the blocks present plane faces which can slide easily either on the underlying stones or one over another if they are disposed in several layers. These sliding movements tend to disrupt the stability of the structure. Finally, this type of outer layer provides few, if any, voids to permit passage of the water, particularly if the blocks are joined by mortar. Therefore, a difference in pressure between the opposite sides of such a structure can be created which will cause the wrecking of the structure by upheaval of the blocks constituting the facing of the structure. If one provides sufficient spaces between the blocks to limit that pressure difference, then the movements resulting from hydraulic action or from movements of the earth tend to displace the blocks and may thereby close the openings and produce a solid facing.

Sometimes such blocks are piled loosely and are allowed to remain at their angle of repose. In that manner the defects of impermeability of the structure and the lack of roughness of the surface may be partially remedied. However, especially in the case of structures exposed to the sea, the violence of the action of the waves is such that the blocks tend constantly to be moved. That movement causes the blocks to form in certain places a structure presenting all the defects which have been pointed out above.

It has been proposed to use in river embankments blocks having the shape of a tetrahedron. These blocks have the advantage that they are more stable than parallelepiped blocks, since they have a center of gravity which is very low when they rest on one of their bases. However, the tetrahedron blocks present the same difficulties as the parallelepiped blocks although in a reduced degree. Particularly, since all their faces are plane, they are susceptible to the formation of solid walls without openings. Furthermore, their points and angles are very fragile.

Construction blocks built in accordance with the present invention have forms such that the difficulties and dangers pointed out above are eliminated or reduced to a minimum. According to the invention, this result is obtained:

(1) By giving to the blocks a form having projections separated by recessed portions substantially wider than the projections, so that the recessed portions may receive the projections of other blocks in a pile, thereby promoting interlocking of the blocks. The provision of recessed portions that are wider than the projections is also effective to produce a substantial volume of voids in the pile, which voids cannot be filled by any displacement of the blocks.

(2) By seeking the best possible construction to assure a high intrinsic stability of the blocks either in the positions where they fall naturally or in positions in which they are placed, if they are piled in a regular manner during construction. With this object, the form of the blocks should be as different as possible from all substantially spherical, cylindrical or conical forms in order to avoid easy rolling of the blocks. That result may be obtained by limiting the number of principal projections. It is preferable to use four projections, and the number should never be greater than six.

Other preferred but not absolutely necessary features of blocks constructed in accordance with the invention are:

a. The use of rounded projections, joined to the body of the block by enlarged bases contoured to avoid abrupt changes in section or angles where the concentration of stress might initiate a rupture.

b. The reduction to a minimum of the areas of any plane faces on the blocks, so as to make the sliding of the blocks over one another difficult, if not impossible.

Blocks constructed in accordance with the invention have a semi-massive form which may conveniently be fabricated from many different materials and by many different processes, but are especially adaptable to fabrication from unreinforced concrete, which is very advantageous for use in sea water. It is well known that reinforced concrete has a short life in sea water. The salt in the water penetrates to the steel reinforcements and attacks them rapidly. The rust increases and causes the breaking up of the concrete and the rapid destruction of the structure itself.

Blocks constructed according to the invention are preferably formed of molded concrete, and it is preferable to vibrate the mold while forming the blocks. Many known procedures for working and formation of concrete may advantageously be utilized in their construction.

Since blocks according to the invention may be built completely of concrete without reinforcement, they differ completely from fascines, chevaux de frise and other known "retard" structures. These latter structures cannot be constructed completely from concrete without reinforcements, since they necessarily require parts of wood, steel or reinforced concrete.

In order to facilitate an understanding of the invention, the figures of the attached drawings show several embodiments of blocks having four projections.

Figure 1:
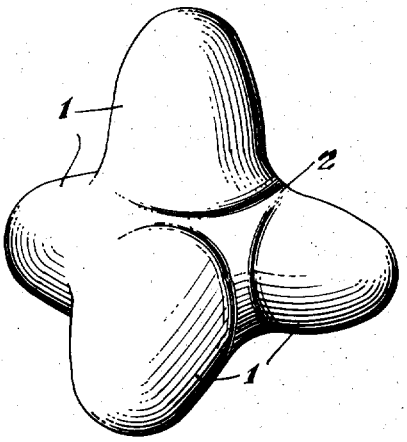
Figure 1 is a perspective view of a four projection block constructed in accordance with the invention.

In Figure 1, there is shown a block having a form derived from a tetrahedron, but presenting by contrast the following differences: the faces and the profiles of the ridges of the blocks are concave. The ridges and the points are rounded, so that the cross-section of each projection, taken on a plane perpendicular to the axis of the projection, is free of angles and has a convex periphery. The axes of the four projections radiate substantially from a common center and are substantially equally angularly spaced. The projections 1 which replace the points of the tetrahedron are joined by wide fillets 2 especially formed with concave profiles with a view to high shock resistance. In manufacturing these blocks, the mold box may, for example, be made in four parts so as to permit easy removal from the mold and to facilitate vibration of the concrete.

Figure 2:
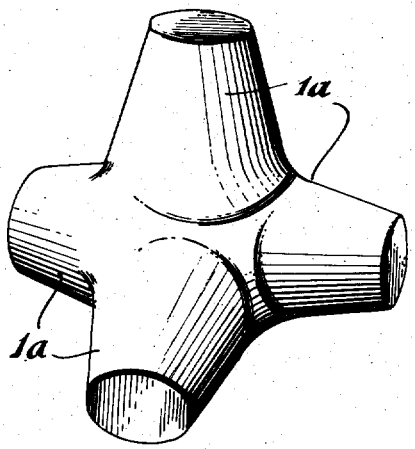
Figures 2, 3 and 4 are perspective views of modified forms of blocks built in accordance with the invention.

In the modified form shown in Figure 2, the projections 1a have the form of a truncated cone, which may facilitate the construction of a mold box from welded plates, for example.

Figure 3:
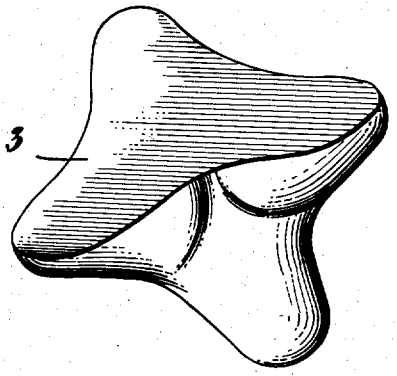

In the modification shown in Figure 3, one of the faces of the block is plane. This has the advantage of permitting the manufacture of the block in a one piece mold, which may be formed of molding sand, for example, without a cover. Such a mold may be constructed by using an existing block as a pattern, and may be readily fashioned in a construction yard near the site of the structure being built. It should be noted that the presence of the one plane face reduces somewhat the desirable qualities of the block, but the ease of fabrication may nevertheless make this type of construction preferable.

Figure 4:
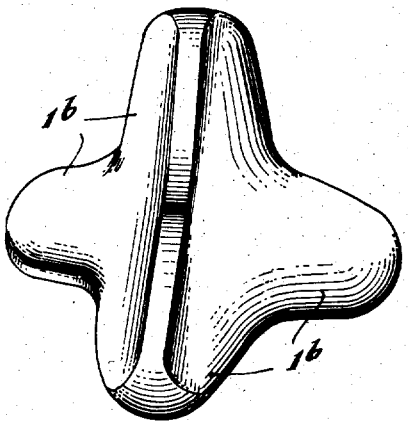

Figure 4 shows a type of clock derived from that shown in Figure 1, in which the volume of cement is reduced by designing the projections 1b with a cross-section which is substantially triangular.

The forms of blocks which have been described lend themselves particularly well to handling during construction, since it is very easy to pass ropes and slings between the projections of the blocks. Ease of handling is very advantageous because the breaking of blocks of conventional form by shocks occurring during construction is quite common.

Blocks constructed in accordance with the invention have the intrinsic advantages of the tetrahedron form, particularly since they have a very low center of gravity when resting on their faces and also are not likely to roll, in whatever position they may be resting. Furthermore, these blocks have advantages which result from the improvements peculiar to the present invention, particularly the absence of extensive plane faces and the presence of projections which improve the roughness of the slope and increase the friction between the blocks of the structure.

Figure 5:
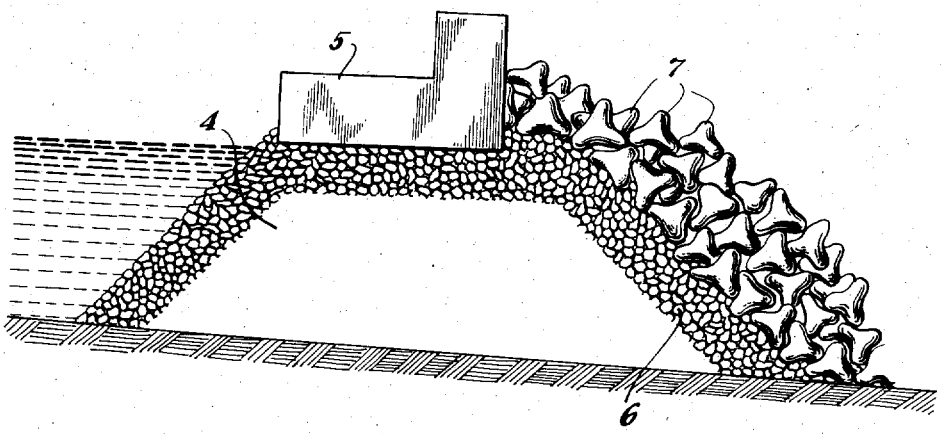
Figure 5 is a cross-sectional view of a dike constructed in part with blocks of the type shown in Figure 1.

Figure 5 shows the use of blocks built in accordance with the invention in the construction of a breakwater having sloping walls. There is shown at 4 the body of the breakwater built of natural stones and supporting a crown 5 of concrete, and having a protective surface whose slope 6, which is exposed to the sea, is covered by blocks 7 formed in accordance with the invention and piled at random. There is obtained thereby a very stable slope which is also relatively steep, and thereby permits a considerable economy of material in the construction of the breakwater.

Figure 6:
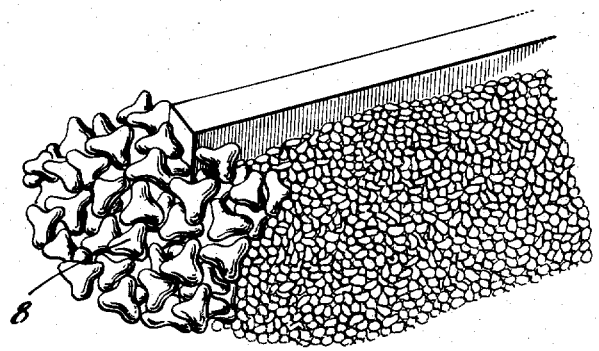
Figure 6 is a perspective view of the outer end of a dike or breakwater constructed of blocks built in accordance with Figure 1.

Figure 6 shows the use of blocks formed in accordance with the invention to provide a protective structure at the end of a breakwater. There again, a very steep sloping surface 8 may be provided which has a very high stability even though it is subject to the action of the waves.

In some cases it may be desirable to cover blocks formed in accordance with the invention with a layer of bituminous material, such as bitumen or asphalt so as to cause them to stick to one another. It should be noted that this sticking is effective only against forces of short duration such as the pressures due to wave actions. On the contrary, where the forces concerned are of long duration such as those due to gravity and to the pressure of the earth, for example, the bitumen or asphalt acts as a lubricant. It is not possible to use such a lubricant on conventional blocks having large plane faces susceptible to sliding over one another and having no projections which can interlock the blocks with one another.

When these blocks are placed in a loose pile which is subject to the action of waves, they may be moved somewhat by the first few waves which strike them. However, they rapidly assume positions where they have a maximum stability and are tightly interlocked with one another.

As used in this specification, the phrase "bituminous material" means any material having the qualities of rigidity against forces of short duration and plasticity against forces of long duration, which qualities are characteristic of asphalt and bitumen.

Figure 7:
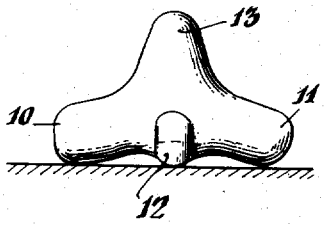
Figure 7 is a perspective view of another modified form of block constructed in accordance with the invention.
Figure 8:
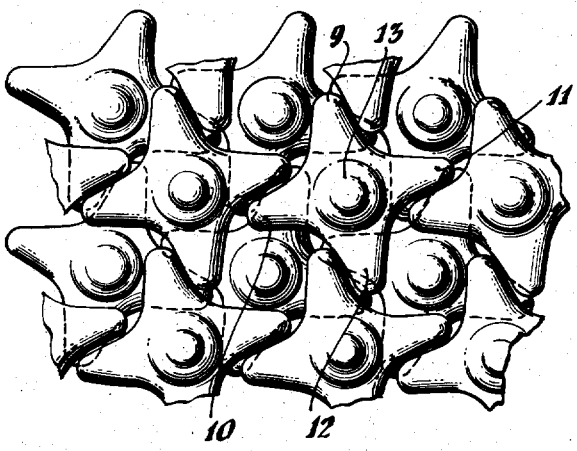
Figure 8 is a fragmentary plan view showing two layers of a structure built with the blocks of Fig. 7.

Fig. 7 shows a single block having five projections, and Fig. 8 shows two layers of a pile of such blocks. These blocks have four projections 9, 10, 11 and 12 located in the horizontal plane as shown in the drawings, and at right angles to one another. The fifth projection 13 extends vertically upward. All the projections are rounded.

When the blocks of Fig. 7 are assembled in a pile as shown in Fig. 8, the projections 9, 10, 11 and 12 interlock with the corresponding projections of other blocks in the same layer, while the projections 13 interlock with the blocks in the layer above. In this way, a regular pile may be formed, with each block held in a definite position.

Figure 9:
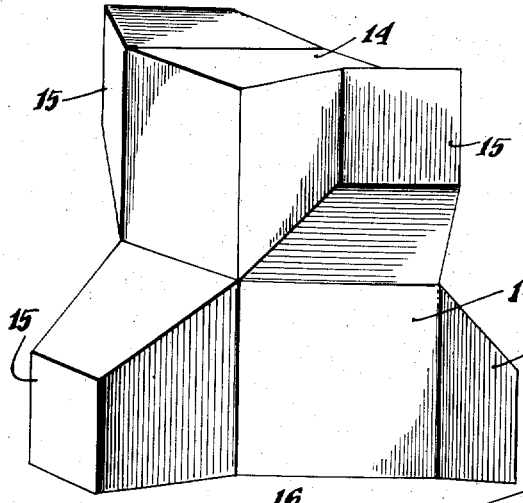
Figures 9 and 10 are perspective views of still other modified forms of blocks embodying the invention.

Fig. 9 shows a modified form of block having all plane surfaces. It consists of a central parallelepiped 14 and four projections 15, two on one end of the central block and two on the opposite end but shifted 90° to the other faces of parallelepiped 14. The projections 15 extend not only laterally from the central parallelepiped but outwardly so that their extremities extend beyond the plane surfaces at the block ends.

It may be readily seen that the projections 15 are separated by recesses much wider than the projections, so that when the blocks are piled, they will interlock and will also provide the necessary high proportion of voids.

Figure 10:
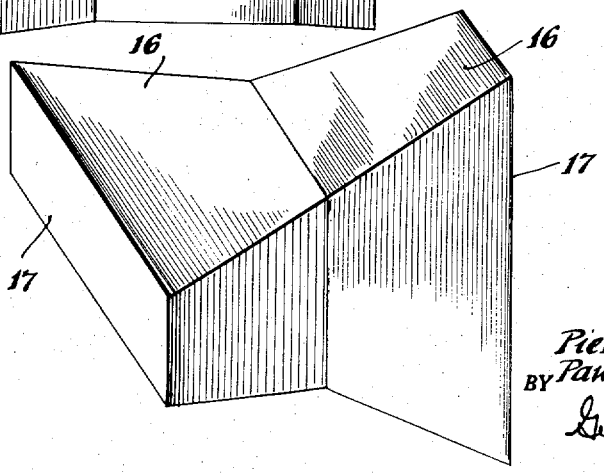

Fig. 10 shows a simpler form of block having plane surfaces. This block is formed of two equal trapezohedrons 16 having parallel bases, one of which is substantially square and the other oblong. The square bases are joined to form a block having parallel plane oblong ends 17 with their long dimensions set at right angles to one another. These ends are connected by four sides, each formed by two planes which intersect at a wide dihedral angle so as to form shallow recesses in said sides. The two plane ends are the equivalent of the projections in the other embodiments shown. The sides are recessed sufficiently to receive and interlock with the projections of adjacent blocks when placed in a pile, while providing the necessary voids in the pile.

We claim:

1. A block for building structures exposed to the action of moving water, said block being constituted of a massive central body portion and four or five protuberances thereon radiating outwardly from a common central point within said body along four or five axes respectively that define substantially equal angles between said four or five axes respectively, said protuberances each being in the form of a truncated body and being gradually tapered outwardly to a terminal area of substantial extent, the cross-sections of said central body and said protuberances at their points of attachment being approximately equal, said protuberances cooperating to support said body in a stable manner in any of a plurality of resting positions, and said block having a low center of gravity in said resting positions.

2. A block as defined in claim 1, wherein substantially all the surfaces of said block and of said protuberances are smoothly curved.

3. A block as defined in claim 1, wherein said protuberances take the form of truncated cones.

4. A block as defined in claim 1, wherein one side of said central body is defined by a plane surface, at least three of said protuberances are defined along one side by plane surfaces lying in the same plane as said plane surface of said central body, and one of said protuberances extends outwardly from said central body from the side opposite to said plane surface substantially at right angles thereto.

5. A block as defined in claim 1, wherein the central body is provided with four protuberances equally spaced about the outside thereof and wherein said protuberances present narrow flattened surface areas extending lengthwise thereof from their respective terminal areas toward said central body, the flattened area on one side of one of said protuberances merging with the flattened area on an opposed protuberance adjacent the points of joinder of said protuberances with said central body.

6. A block as defined in claim 1 having five protuberances, four of said protuberances lying substantially in a common plane and extending substantially at right angles to one another, so that a plurality of said blocks may be arranged side by side in said plane with said four protuberances interlocking to form one structural layer, the fifth of said protuberances extending substantially perpendicular to all of said four protuberances so as to project into and interlock with a second structural layer of blocks parallel to said one layer.

7. A block as defined in claim 1 wherein the spaces separating said protuberances are of substantially greater volume than said protuberances, said spaces being effective to receive loosely the protuberances of other blocks when assembled therewith in a pile so that the blocks when piled randomly tend to interlock, said spaces and projections coperating to provide a relatively stable interlocked pile provided with a sufficient volume of voids to permit flow of water therethrough without creating excessive internal pressures.

8. A block for building structures exposed to the action of moving water, said block being constituted of a massive central body portion having four protuberances radiating symmetrically outward from a common central point within said body, said protuberances each being in the form of a truncated body having a cross-section at its point of attachment to said central body approximating the greatest cross-section of said central body and being gradually tapered outwardly from said point of attachment to a terminal area of substantial extent, said protuberances being substantially of equal length and cooperating to support said block on any three legs with the unsupporting leg extending normal and upward from the supporting plane described by the ends of said three supporting legs whereby said block has a low center of gravity when so supported.

9. A structure such as a jetty or breakwater and the like suitable for exposure to the action of moving water, said structure having a high degree of permeability to water, stability under wave action and hydraulic roughness, which comprises a plurality of randomly piled blocks, said blocks each being constituted of a massive central body having four or five protuberances thereon radiating outwardly from a common central point within said body along four or five axes respectively that define substantially equal angles between said four or five axes respectively, said protuberances each being in the form of a truncated body and being gradually tapered outwardly to a terminal area of substantial extent, the cross-sections of said central body and said protuberances at their points of attachment being approximately equal, said blocks having a low center of gravity in a plurality of resting positions when standing alone, said protuberances on each block defining spaces between themselves loosely receiving the protuberances of other blocks of substantially the same dimensions when assembled therewith in a pile so that the piled blocks tend to interlock, said spaces and protuberances cooperating to provide a substantial volume of voids in the pile.

10. A structure such as a breakwater and the like suitable for exposure to the action of moving water, said structure having a high degree of permeability to water, hydraulic roughness and stability under wave action, which comprises a plurality of randomly piled blocks, said blocks each having four or five protuberances whose respective axes radiate substantially from a massive central body and define substantially equal angles with one another at the center of said body, each such protuberance being in the form of a truncated body having a cross-section, taken on a plane perpendicular to the axis of the protuberance, whose periphery is generally convex and free from sharp angles, the bases of said protuberances being joined to each other adjacent the points where they merge with said central body, said protuberances cooperating to support said body in a stable manner in any of a plurality of resting positions when standing alone, and said blocks having a low center of gravity in said resting positions.

11. A structure such as a breakwater and the like suitable for exposure to the action of moving water, said structure having a high degree of permeability to water, hydraulic roughness and stability under wave action, comprising a plurality of randomly piled blocks, said blocks each having four protuberances whose axes radiate from a massive central body and define substantially equal angles with one another at the center of said body, each said protuberance being in the form of a truncated body having a cross-section, taken on a plane perpendicular to the axis of said protuberance, whose periphery is generally convex and free from sharp angles, the bases of said projections being joined to each other adjacent the points where they merge with said common central body by fillets having concave profiles, said protuberances cooperating to support said body in a stable manner in any of a plurality of resting positions when standing alone, and said blocks having a low center of gravity in said resting positions.

12. A structure according to claim 11 wherein each of said protuberances is generally in the form of a truncated cone.

13. A structure such as a jetty or breakwater and the like suitable for exposure to the action of moving water, said structure having a high degree of permeability to water, stability under wave action and hydraulic roughness, which comprises a plurality of randomly piled blocks as defined in claim 8, said protuberances on each block defining spaces between themselves loosely receiving the protuberances of other blocks of substantially the same dimensions when assembled therewith in a pile so that said piled blocks tend to interlock, and said spaces and said protuberances cooperate to provide a substantial volume of voids in the pile.

14. A structure such as a jetty or breakwater and the like suitable for exposure to the action of moving water comprising a conventional elongated mound having a front sloping side wall facing seaward, a rear sloping side wall facing landward, and a plurality of randomly piled blocks as defined in claim 8 covering said seaward slope to impart thereto a high degree of water permeability, stability under wave action and hydraulic roughness, said protuberances on each block defining spaces between themselves to loosely receive the protuberances of other blocks of substantially the same dimension when assembled therewith in a pile so that the blocks tend to interlock, and said spaces and said protuberances cooperate to provide a substantial volume of voids on said seaward slope.

*15. A structure such as a jetty or breakwater and the like suitable for exposure to the action of moving water, said structure having a high degree of permeability to water, stability under wave action and hydraulic roughness, which comprises a plurality of blocks arranged in assembled relation in the form of a pile presenting a sloping surface exposed to the action of said moving water, said blocks each being constituted of a massive central body having four or five protuberances thereon radiating outwardly from a common central point within said body along four or five axes respectively that define substantially equal angles between said four or five axes respectively, said protuberances each being in the form of a truncated body and being gradually tapered outwardly to a terminal area of substantial extent, the cross-*

*sections of said central body and said protuberances at their points of attachment being approximately equal, said blocks having a low center of gravity in a plurality of resting positions when standing alone, said protuberances on each block defining spaces between themselves loosely receiving the protuberances of other blocks of substantially the same dimensions when assembled therewith in a pile so that the piled blocks tend to interlock, said spaces and protuberances cooperating to provide a substantial volume of voids in the pile.*

*16. A structure such as a jetty or breakwater and the like suitable for exposure to the action of waves generated in a body of water, said structure having a side wall exposed to the waves generated in said body of water, and a plurality of blocks as defined in claim 8 assembled in the form of a pile along and in protecting relation to said side wall, said pile having a high degree of water permeability, stability under wave action and hydraulic roughness, the protuberances on each block defining spaces between themselves to loosely receive the protuberances of other blocks of substantially the same shape when assembled therewith in a pile so that the blocks tend to interlock, and said spaces and said protuberances cooperate to provide a substantial volume of voids in said pile.*

References Cited in the file of this patent or the original patent

UNITED STATES PATENTS

| | | |
|---|---|---|
| 919,788 | Smith | Apr. 27, 1909 |
| 1,716,509 | Smith | June 11, 1929 |
| 2,028,794 | Matthes | Jan. 28, 1936 |
| 2,164,108 | Greulich | June 27, 1939 |

FOREIGN PATENTS

| | | |
|---|---|---|
| 858,076 | France | of 1940 |